United States Patent [19]

Matsuoka et al.

[11] Patent Number: 4,931,483

[45] Date of Patent: Jun. 5, 1990

[54] POLYMER/POLYOL COMPOSITION, PROCESSES FOR MAKING THE SAME AND A POLYURETHANE THEREFROM

[75] Inventors: Masahiro Matsuoka, Kyoto; Keiichi Akimoto, Osaka; Takeshi Sumita, Ohtsu; Tsuyoshi Tomosada, Kyoto; Isao Ishikawa, Ohtsu, all of Japan

[73] Assignee: Sanyo Chemical Industries, Ltd., Kyoto, Japan

[21] Appl. No.: 279,508

[22] Filed: Dec. 5, 1988

[30] Foreign Application Priority Data

Dec. 4, 1987 [JP] Japan .................. 62-308417
Dec. 14, 1987 [JP] Japan .................. 62-315641
Jul. 8, 1988 [JP] Japan .................. 63-171384

[51] Int. Cl.$^5$ .......................................... C08G 18/14
[52] U.S. Cl. ........................... 521/137; 524/722; 524/724; 524/732; 524/755; 524/760; 524/762; 524/773; 524/776; 525/131
[58] Field of Search .......... 521/137; 524/722, 724, 524/732, 755, 760, 762, 773, 776; 525/131

[56] References Cited

U.S. PATENT DOCUMENTS 3,304,273 2/1967 Stamberger .................. 260/2.5
4,161,468 7/1979 Davis et al. .................. 524/773
4,659,772 4/1987 Hoy et al. .................... 524/755

FOREIGN PATENT DOCUMENTS 1063222 3/1967 United Kingdom .

*Primary Examiner*—Maurice J. Welsh
*Attorney, Agent, or Firm*—Oblon, Spivak, McClelland, Maier & Neustadt

[57] ABSTRACT

Polymer/polyol compositions, obtained by polymerizing, in situ in a polyol, one or more ethylenically unsaturated monomers comprising an alpha-olefin containing at least 5 carbon atoms and/or an acrylate or methacrylate ester of an alcohol containing at least 9 carbon atoms, which are of relatively low viscosity and which afford polyurethanes having improved properties.

20 Claims, No Drawings

POLYMER/POLYOL COMPOSITION, PROCESSES FOR MAKING THE SAME AND A POLYURETHANE THEREFROM

BACKGROUND OF THE INVENTION

1. Field of the Invention

This invention relates to polymer/polyol compositions that are suitable for producing polyurethanes. The invention also relates to methods for making such compositions and to methods for making polyurethanes therefrom.

2. Discussion of the Background

It is known that polyurethanes can be produced by reacting an organic polyisocyanate with a polymer/-polyol composition, obtained by polymerizing one or more ethylenically unsaturated monomers (such as acrylonitrile and/or styrene) in situ in a polyol (such as polyether polyol).

However, the known polymer/polyol compositions suffer from the disadvantage that a higher viscosity is obtained when the polymer content is increased in order to produce polyurethanes of improved properties. Further, polyurethanes obtained from such polymer polyols have poor properties, such as elasticity.

SUMMARY OF THE INVENTION

Accordingly, it is an object of the present invention to provide polymer/polyol compositions, which are of lower viscosity, even at a higher polymer content.

It is another object of this invention to provide polymer/polyol compositions, which are capable of providing polyurethanes having improved properties.

It is still another object of this invention to provide a process for producing such polymer/polyol compositions.

It is yet another object of the invention to provide a process for producing polyurethanes having improved physical properties, such as elasticity.

These and other objects of the present invention as hereinafter will become more readily apparent have been attained by providing a polymer/polyol composition, obtained by polymerizing, *in situ* in situ in a polyol, one or more ethylenically unsaturated monomers comprising an alpha-olefin containing at least 5 carbon atoms, an acrylate or methacrylate ester of an alcohol containing at least 9 carbon atoms, or a mixture of two or more of the same; said polyol comprising a polyol having a hydroxyl number of 15 to 200, and being selected from the group consisting of polyether polyols, polyester polyols, modified polyols and polymer polyols previously prepared in situ in any of these polyols, said polymer being present in an amount of 1-80% based on the weight of the composition which composition are convertible by reaction with polyisocyanates to polyurethanes.

DETAILED DESCRIPTION OF THE PREFERRED EMBODIMENTS

The polymer/polyol compositions can be produced, for example, by polymerizing, in situ in at least one polyol, one or more ethylenically unsaturated monomers comprising an alpha-olefin containing at least 5 carbon atoms.

Suitable alpha-olefins contain usually at least 5 carbon atoms, preferably 6-30, more preferably 8-20, particularly 11-18 carbon atoms; and include, for example, 1-hexene, 1-octene, 1-decene, 1-dodecene, 1-tetradecene, 1-hexadecene, 1-octadecene, 1-eicosene, 1-heneicosene, 1-docosene, 1-tricosene, 1-tetracosene, 1-pentacosene, 1-hexacosene, and the like, as well as mixtures of two or more of them. Among these, preferred are 1-octene, 1-decene, 1-dodecene, 1-tetradecene, 1-hexadecene and 1-octadecene.

In combination with such alpha-olefin(s), one or more other ethylenically unsaturated monomers may be used. Preferable examples of other monomers are aromatic hydrocarbon monomers, such as styrene, alpha-methyl styrene, and the like; unsaturated nitriles, such as (meth)acrylonitrile [acrylonitrile and methacrylo-nitrile; similar expressions are used hereinafter]; and (meth)acrylate esters, including alkyl (meth)acrylates containing 1-30 or more carbon atoms in the alkyl group, such as methyl, butyl, nonyl, decyl, undecyl, dodecyl, tridecyl, tetradecyl, pentadecyl, hexadecyl, octadecyl, eicosyl and docohyl (meth)acrylates.

One or more monomers other than above may also be used if necessary. Suitable examples of such monomers include ethylenically unsaturated carboxylic acids and derivatives thereof, such as (meth)acrylic acids, and (meth)acrylamides; aliphatic hydrocarbon monomers, such as ethylene and propylene; fluorine-containing vinyl monomers, such as perfluorooctylethyl (meth)acrylates; nitrogen-containing vinyl monomers, such as dialkylaminoethyl (meth)acrylates and morpholinoethyl (meth)acrylates; vinyl-terminated silicones, and the like.

In producing polymer/polyols by polymerizing one or more ethylenically unsaturated monomers comprising an alpha-olefin containing at least 5 carbon atoms, the content of alpha-olefin is usually 0.5-50%, preferably 1-20%, based on the total weight of the monomers. When the content of alpha-olefin is less than 0.5%, the resulting polymer/polyol compositions become viscous at higher polymer content; and use of more than 50% causes difficulties in producing polyurethane foams.

The content of aromatic hydrocarbon monomer is generally 0-90%, preferably 0-80%, based on the total weight of the monomers. Polymer/polyol compositions, obtained by using more than 90% of styrene, provide polyurethanes of poor rigidity. The content of unsaturated nitrile is usually 0-99.5%, preferably 20-99%. Weight ratio of aromatic hydrocarbon monomer/unsaturated nitrile is usually 0/100-80/20, preferably 0/100-70/30. The content of (meth)acrylate ethers is generally 0-50%, preferably 0-20%. Use of more than 50% of (meth)acrylate esters results in viscous polymer/polyol compositions at higher polymer content. The amount of monomers other than above is usually 0-30%, preferably 0-10%.

As another embodiment of the invention, polymer/-polyol compositions may be produced by polymerizing, *in situ* in at least one polyol, one or more ethylenically unsaturated monomers comprising a (meth)acrylate ester of an alcohol containing at least 9 carbon atoms.

Suitable (meth)acrylates include those represented by the general formula:

$$CH_2=CR'-COO-R \qquad (1)$$

wherein R' is hydrogen or methyl group, and R is an alkyl group containing 9-30 carbon atoms.

As the alkyl group R in the general formula (1), there may be mentioned straight-chain or branched alkyl groups, such as nonyl, decyl, undecyl, dodecyl, tridecyl, tetradecyl, pentadecyl, hexadecyl, octadecyl, eicosyl and docosyl groups. Among these, preferred are those containing 12–22 carbon atoms. The use of alkyl groups containing less than 8 carbon atoms results in a great reduction in rebound elasticity of the polyurethanes. Examples of monomers represented by the general formula (1) are nonyl (meth)acrylates, decyl (meth)acrylates, undecyl (meth)acrylates, dodecyl (meth)acrylates, tridecyl (meth)acrylates, tetradecyl (meth)acrylates, pentadecyl (meth)acrylates, hexadecyl (meth)acrylates, octadecyl (meth)acrylates, eicosyl (meth)acrylates, docosyl (meth)acrylates, and mixtures of two or more of them.

In conjunction with the monomer of the general formula (1), one or more other monomers can also be used if desired. Suitable examples of such monomers are unsaturated nitriles, such as (meth)acrylonitrile; ethylenically unsaturated carboxylic acids and derivatives thereof, including (meth)acrylic acids and (meth)acrylates, such as alkyl(C1-8) (meth)acrylates and nitrogen-containing (meth)acrylates; aliphatic hydrocarbon monomers, such as ethylene, propylene and alpha-olefins containing 4–20 carbon atoms; aromatic hydrocarbon monomers, such as styrene and alpha-methyl styrene; and vinyl monomers other than above, such as nitrostyrenes and vinyl acetate, and the like. Among these, preferred are methyl methacrylate, nitrogen-containing (meth)acrylates, acrylonitrile, styrenes, and mixtures of them. Particularly preferred is methyl methacrylate.

In producing polymer/polyols by polymerizing one or more ethylenically unsaturated monomers comprising a (meth)acrylate ester of an alcohol containing at least 9 carbon atoms, the content of said (meth)acrylate ester is usually at least 5%, preferably 30% or higher, based on the total weight of the monomers.

Suitable polyols employed for producing polymer/polyol compositions according to this invention include, for example, polyether polyols, polyester polyols, and mixtures of them, both of which polyols are usually used as raw materials for producing polyurethanes.

Illustrative of such polyether polyols are those obtainable by addition of alkylene oxide to compounds containing at least two (preferably two to eight) active hydrogen atoms, such as polyhydric alcohols, polyhydric phenols, amines, polycarboxylic acids, phosphoric acids and the like, and mixtures of two or more of such adducts.

Suitable examples of polyhydric alcohols include diols, for example, alkylene glycols, such as ethylene glycol, propylene glycol, 1,3- and 1,4-butane diols, 1,6-hexane diol, neopentryl glycol, diethylene glycol and the like, and cyclic group-containing diols, as written in JPN Patent Publication No. 1474/1970, such as bis(hydroxymethyl) cyclohexane, bis(hydroxyethyl)benzene, and the like; trihydric alcohols, such as glycerol, trimethylolpropane, trimethylolethane, hexane triol, triethanol amine, and the like; tetrahydric alcohols, such as pentaerythritol, alpha-methylglucoside, diglycerol, and the like; and polyols having higher functionality (5–8 or higher), for example, sugar alcohols, including pentitols (such as adnitol, arabitol and xylitol) and hexitols (such as sorbitol, mannitol, iditol, talitol and dulcitol), saccharides, including monosaccharides (such as glucose, mannose, fructose, galactose, allose, altrose, talose, glucose, idose, sorbose, psicose and tagatose), di- or oligo-saccharides (such as sucrose, trehalose, cellobiose, lactose ad raffinose), glycosides, such as glucosides of polyols (for instance, glycols, such as ethylene glycol and propylene glycols, alkane polyols, such as glycerol, trimethylolpropane, hexane triol and pentaerythritol); poly(alkane polyol)s (polyglycerols, such as triglycerol and tetraglycerol, and polypentaerythritols, such as dipentaerythritol and tripentaerithritol), and cycloalkane polyols, such as tetrabis(hydroxymethyl) cyclohexanol.

Exemplary of suitable polyhydric phenols are mononuclear phenols, such as hydroquinone, catechol, resorcin, pyrogallol and phloroglucinol, and polynuclear phenols, for example, bisphenols, such as bisphenol A, bisphenol F, bisphenol sulfon and the like, as well as phenol-formaldehyde condensation products (novolaks), such as polyphenols as disclosed in U.S. Pat. No. 3,265,641.

Suitable amines are inclusive of ammonia; alkanol amines, such as mono-, di- and tri- ethanol amines and isopropanol amines, and aminoethylethanolamine and the like; aliphatic, aromatic, araliphatic and alicyclic monoamines, for example, $C_1$–$C_{20}$ alkyl amines (such as methyl, ethyl, isopropyl, butyl, octyl and lauryl amines, and the like), aniline, toluidine, naphthyl amines, benzyl amine, cyclohexyl amine and the like; aliphatic, aromatic, araliphatic and alicyclic polyamines, such as $C_2$–$C_6$ alkylene diamines (such as ethylene diamine, propylene diamine, hexamethylene diamine and the like), polyalkylene polyamines (such as diethylene triamine, triethylene tetramine and the like), aromatic diamines (such as tolylene diamines, phenylene diamines, xylyene diamines, methylene dinilines, diphenylether diamines and other aromatic polyamines), alicyclic diamines (such as isophorone diamine, cyclohexylene diamines, dicyclo-hexylmethane diamines and the iike); and heterocyclic polyamines, such as piperazine, N-aminoethylpiperazine, and other heterocyclic polyamines, described in Japan Patent Publication No. 21044/1980.

Two or more of these active hydrogen atom-containing compounds may also be used in conjunction.

Among these active hydrogen atom-containing compounds, preferred are polyhydric alcohols. Among polyhydric alcohols, preferred are ethylene glycol, propylene glycol, glycerol, trimethylol propane, hexane triol, pentaerythritol, methylglucoside, sorbitol and sucrose.

Suitable alkylene oxides (hereinafter referred to as AO), employed for producing polyether polyols, include, for example, ethylene oxide (hereinafter referred to as EO), propylene oxide (hereinafter referred to as PO), 1,2-, 2,3-, 1,3- and 1,4-butylene oxides, styrene oxide, epichlorohydrin and the like, as well as combinations of two or more of them (block and/or random addition). Among these, preferred are EO and/or PO, and combination thereof with smaller amount (such as up to 5% based on the total weight of AO) of other AO.

Addition of alkylene oxides to active hydrogen atom-containing compounds can be carried out in the usual way, with or without catalysts, such as alkaline catalysts, amine catalysts and acidic catalysts, under normal or elevated pressure, in a single step or multistages.

In general, among polyether polyols, preferred are those containing a polyoxypropylene chain, and those containing both polyoxypropylene and polyoxyethylene chains. Such polyether polyols, include those obtained by addition of PO to active hydrogen atom-containing compound(s) as stated above; block adducts obtained by adding PO and EO to active hydrogen atom-containing compound(s), in such manners as (1) adding PO followed by EO (tipped), (2) adding PO—EO—PO—EO in this order (balanced), (3) adding EO—PO—EO in this order, and (4) adding PO—EO—PO in this order (activated secondary); random adducts, such as (5) mixed-adding EO/PO; and random/block adducts, such as (6) adding PO—EO/PO optionally PO—EO in this order as described in Japanese Laid-Open Patent No. 209920/1982, and (7) adding EO/PO followed by EO, as described in Japanese Laid-Open Patent No. 13700/1978. (In the above, EO/PO means a mixture of EO and PO.) Smaller amount (for instance, up to 5% based on the total weight of AO) of other AO (such as butylene oxides, styrene oxides) may be contained in any of PO and/or EO in the above.

The content of polyoxyethylene chains (hereinafter referred to as EO content) may be varied widely.

When moderate or slow curability is desirable, EO content is generally 25% or less, based on the total weight of AO.

In case where rapid curability is required, the EO content is usually at least 5%, preferably 7–50%, more preferably 10–40%, in view of reactivity, curing characteristics, initial physical properties, compatibility and uniform reaction with isocyanates, and workability. There may be used polyether polyols of EO content less than 5% in combination with ones of EO content more than 5%, or ones of EO content more than 50% with ones of EO content less than 50%, so as to provide an average EO content within the above range.

For rapid curability, particularly preferred are polyols containing terminal polyoxyethylene chains. The terminal EO content is usually at least 5%, preferably at least 7, more preferably 7–30%. The inner EO content is generally at most 50%, preferably 10–40%. The primary hydroxyl content of such polyols is usually at least 20%, preferably at least 30%, more preferably at least 50%, most preferably at least 70%.

Suitable polyester polyols are inclusive of condensation products of polyols [dihydric alcohols (such as ethylene glycol, propylene glycol, 1,3- and 1,4-butane diols, 1,6-hexane diol, neopentyl glycol, and diethylene glycol) or combinations thereof with trihydric or higher functional polyhydric alcohols (such as glycerol, trimethylolpropane and the like)]and/or polyether polyols (such as those described above) with dicarboxylic acids (for example, aliphatic or aromatic dicarboxylic acids, such as glutaric, adipic, sebacic, fumaric, maleic, phthalic and terephthalic acids) or ester-forming derivatives thereof (anhydrides and lower alkyl esters, such as maleic and phthalic anhydrides, dimethyl terephtharate, and the like); and ring-opening polymerization products of lactones (such as epsilon-caprolactone).

Instead of or in combination with these polyols (polyether polyols and/or polyester polyols), modified polyols, for example, urethane-modified polyols (OH-terminated urethane prepolymers) prepared from organic polyisocyanates and excess of these polyols, and polyols containing polymerizable unsaturated bonds in the molecules (such as maleic anhydride-modified polyols) may also be employed for producing polymer/polyol compositions in accordance with this invention.

Among these, preferred are polyether polyols.

These polyols (polyether polyols or other high molecular weight polyols), used for producing polymer/polyol compositions according to the invention, have usually 2–8 hydroxyl groups, preferably 2.3–4 hydroxyl groups (average). Hydroxyl number (hereinafter referred to as OHV) of these polyols is usually 200 or less, preferably 15–100, more preferably 20–70. Polyols having OHV of more than 200 result in high rigid and brittle polyurethanes. The molecular weight of these polyols is usually 2000–30000 or higher, more preferably 2500–25000, preferably 3000–10000, in view of the moldability and elasticity of the resulting polyurethanes.

These polyols (polyether polyols or other high molecular weight polyols) can be used as a mixture of those having different OHV, for instance, a mixture of a major amount (usually at least 50% by weight) of those having an OHV of 70 or less and those having an OHV of 80–500. These polyols may also be used in combination with a minor amount (for examples, 20% by weight or less, particularly 5% or less) of low molecular weight polyols having high OHV (such as 700 or more). Examples of such low molecular weight polyols include polyhydric alcohols, as mentioned above as the raw materials for polyether polyols, as well as low mole alkylene oxide (such as EO and/or PO) adducts of active hydrogen atom-containing compounds (such as polyhydric alcohols, amines and so on, as described above).

In producing polymer/polyol composition, in accordance with the present invention, the amount of said ethylenically unsaturated monomer is generally 1–80 parts, preferably 1–60 parts, more preferably 3–50 parts, more preferably 5–20 parts, per 100 parts of the total amount of said polyol and said monomer. Using said monomer above 80 parts results in phase separation into polyol and polymer phases. Lower amount than 1 part leads to polyurethanes of poor physical properties, such as rebound elasticity and firmness.

Preparation of polymer/polyol compositions according to this invention can be carried out in the usual way. Suitable methods include, for example, those by polymerizing monomer in polyol in the presence of polymerization initiator (such as radical generators), as described in U.S. Pat. No. 3,383,351, Japanese Patent Publication Nos. 24737/1964 and 47999/1972 and Japanese Laid-Open Patent No. 15894/1975; and those by grafting polymer, prepared from monomer beforehand, to polyol in the presence of radical generator, as described in Japanese Patent Publication No. 47597/1972. Preferred is the former method.

Polymerization is usually carried out in the presence of polymerization initiators. Illustrative of suitable initiators are free radical generators, for example, azo compounds, such as 2,2'-azobisisobutyro-nitrile (hereinafter referred to as AIBN), 2,2'azobis(2,4-dimethylvaleronitrile) (hereinafter referred to as AVN) and the like; peroxides, such as methyl isobutyl ketone peroxide, dibenzoyl peroxide, lauroyl peroxide, di-t-butyl peroxide, dicumyl peroxide, t-butyl hydroperoxide, di-isopropyl peroxydicarbonate, t-butyl peroxyisopropylcarbonate, t-butyl peroxy(2-ethylhexanoate), t-butyl peroxy-pivalate, 2,5-dimethyl-hexane-2,5-diper-2-ethylhexoate, t-butyl percrotonate, t-butyl perisobutyrate, di-t-butyl perphthalate, 1,1-di-t-butyl peroxy-3,3,5-trimethyl-cyclohexane and the like; persulfates, perborates, persuccinates and so on. Among these, preferred are azo compounds, especially AIBN and AVN, from a practical point of view. The amount of polymerization initiator is usually 0.05–20%, preferably 0.1–10%, more preferably 0.2–5%, based on the weight of monomer.

Polymerization can be performed without any solvents, but it may be carried out in the presence of one or more solvents (particularly in case of producing polymer/polyol compositions of high polymer content). Suitable solvents include, for example, toluene, xylene, acetonitrile, ethyl acetate, hexane, heptane, dioxane, N,N-dimethylacetoamide, isopropanol, n-butanol and the like.

Polymerization may also be carried out in the presence of known chain transfer agents, if necessary. Illustrative of suitable chain transfer agents are halogenated hydrocarbons, such as carbon tetrachloride, carbon tetrabromide and chloroform; alcohols, such as isopropanol, methanol, 2-butanol and allyl alcohol; alkyl mercaptans, such as dodecyl mercaptan and mercaptoethanol; and enolethers as described in Japanese Laid-Open Patent No. 31,880/1980.

Polymerization may be done continuously or batchwise. Polymerization is carried out at temperature above the decomposition temperature of the polymerization initiator, usually at 60° C.–180° C., preferably at 90° C.–160° C., more preferably at 100° C.–150° C., under atmospheric pressure, under pressure or under reduced pressure.

Polymer/polyol compositions obtained after polymerization may be used as raw materials for polyurethane, as such without any after-treatment; but it is desirable to remove impurities such as decomposition products of polymerization initiators, unreacted monomers, organic solvents and so on, by conventional means.

Polymer/polyol compositions thus obtained are translucent or opaque, white or brownish yellow dispersions, in which all the monomers polymerized (namely, polymers) are stably dispersed in polyols.

The polymer content of said polymer/polyol compositions is generally 1–60% or higher, preferably 3–50%, more preferably 5–20%.

OHV of polymer/polyol compositions is generally 5–100, preferably 7–90, more preferably 15–80, most preferably 20–70 mgKOH/g.

In producing polyurethanes from polymer/polyol composition (a), according to the present invention, one or more other active hydrogen atom-containing compounds may be used together, if desired. Such compounds include, for example, high molecular polyols (b) and low molecular weight active hydrogen atom containing compounds (c), and combinations of (b) and (c).

Examples of suitable high molecular weight polyols (b) are polyether polyols, polyester polyols, urethane-modified polyols, and vinyl-modified polyols or polymer/polyols other than (a). Suitable polyether polyols and polyester polyols include the same ones as described as the raw materials for polymer/polyol compositions. Examples of polymer/polyols other than (a) are those obtainable by polymerizing ethylenically unsaturated monomers [those described above (such as acrylonitrile and styrene), except long-chain alpha-olefins and long-chain alkyl (meth)acrylates]in situ in these polyols, polyether polyols and/or polyester polyols, and the like, for instance, those written in Japanese Laid-Open Patent Nos. 101899/1979 and 122396/1979. Polyols from natural oils such as castor oil, polybutadiene polyols and hydroxyl-containing vinyl polymers (such as acrylic polyols), as described in Japanese Laid-Open Patent Nos. 57413/1983 and 57414/1983, for instance, may also be used.

Such high molecular weight polyols (b) usually contain 2–8 or more hydroxyl groups and have OH equivalent weight of 200–4000, preferably 2–4 hydroxyl groups and have OH equivalent weight of 400–3000. Among these polyols, preferred are polyether polyols, particularly polyoxyethylene chain-containing ones, which preferably have an EO content of at least 5%, an internal EO content of 0–50% and a terminal EO content of 0–30%.

Examples of suitable low molecular weight active hydrogen atom-containing compounds (c) include compounds containing at least two (preferably 2–3, particularly 2) active hydrogen atoms (such as hydroxyl, amino and mercapto, preferably hydroxyl) and having a molecular weight of 500 or less (preferably 60–400) or an equivalent weight (molecular weight per active hydrogen atom-containing groups) of at least 30 and less than 200, which compounds are generally called chain-extenders or crosslinkers. Such compounds include, for instance, low molecular weight polyols and aminoalcohols. Illustrative examples of such polyols are dihydric alcohols, such as ethylene glycol, diethylene glycol, propylene glycols, dipropylene glycol, 1,3- and 1,4-butane diols, neopentyl glycol and 1,6-hexane diol; alcohols containing three or more hydroxyl groups, such as glycerol, trimethylol propane, pentaerythritol, diglycerol, alpha-methylglucoside, sorbitol, xylitol, mannitol, dipentaerythritol, glucose, fructose, sucrose and the like; polyhydroxyl compounds having molecular weight of 200–400, obtainable by adding smaller amount of one or more alkylene oxides (such as EO and/or PO) to active hydrogen atom-containing compounds (such as polyhydric alcohols as mentioned above), for example polyethylene containing diols, as disclosed in Japanese Patent Publication No. 1474/1970 [for example, alkylene oxide (such as EO and/or PO) adducts of polyhydric phenols (such as bisphenol A, hydroquinone and the like]; tertiary or quaternary nitrogen atom-containing polyols [for instance, those as described in Japanese Laid-Open Patent No. 130699/1979, N-alkyldialkanol amines (such as N-methyldiethanol amine, N-butyldiethanol amine and the like and quaternarized products of these amines), and trialkanol amines (such as triethanol amine, tripropanol amines and the like)]; and sulfurcontaining polyols, such as thiodiglycol. Suitable aminoalcohols include, for example, mono- and di-alkanolamines, such as mono- and di-ethanol amines and propanol amines. Among these, preferred are low molecular weight polyols (especially diols). More preferred are ethylene glycol, 1,4-butane diol, neopentyl glycol, 1,6-hexane diol, and mixtures of two or more of them.

Other high molecular weight polyols (b) and/or low molecular weight active hydrogen atom-containing compounds (c) may be added to raw materials (polyether polyols) of polymer/polyol compositions (a) according to this invention, during production of (a), or after production of (a).

In producing polyurethanes, using, as active-hydrogen atom-containing components, polymer/polyol compositions (a) according to this invention, with or without other high molecular weight polyols (b) and/or low molecular weight active hydrogen atom-containing compounds (c), the amount of (a) is usually at least 5%, preferably at least 10%, more preferably at least 50%, the amount of (b) is generally 0–70%, more preferably 0–50%, and the amount of (c) is usually 0–30%, preferably 0–25%, more preferably 0–10%, based on the total weight of the active-hydrogen atom-containing components [(a) and optionally (b) and/or (c)]. Use of a lower amount of (a) results in polyurethanes of poor physical properties, such as rebound elasticity or firmness. Using larger amounts of (c) causes high exothermicity, and results in scorching or molded articles having a tendency to form blisters in the vicinity of the inlet and being too rigid and brittle.

In producing polyurethanes according to the invention, there can be used any organic polyisocyanates conventionally employed for the production of polyurethanes. Suitable polyisocyanates include aromatic polyisocyanates containing 6–20 carbon atoms (except carbon atoms in NCO groups), aliphatic polyisocyanates containing 2–18 carbon atoms, alicyclic polyisocyanates containing 4–15 carbon atoms, araliphatic polyisocyanates containing 8–15 carbon atoms, and modified polyisocyanates of these polyisocyanates containing urethane, carbodiimide, allophanate, urea, biuret, urethdione, urethonimine, isocyanurate and/or oxazolidone groups. Illustrative examples of polyisocyanates are:aromatic polyisocyanates, such as 1,3- and/or 1,4-phenylenediisocyanates, 2,4- and/or 2,6-tolylenediisocyanates (TDI), crude TDI, diphenylmethane-2,4'- and/or 4,4'-diisocyanates (MDI), crude MDI or polymethylene-polyphenylenepolyisocyanates (PAPI) obtained by phosgenation of crude diaminodiphenyl methane [condensation products of formaldehyde with aromatic amine (such as aniline) or a mixture thereof:mixtures of diamino-di-phenyl methane and minor amount (such as 2–20%) of polyamine of 3 or higher functionality], naphthalene-1,5-diisocyanate, triphenylmethane-4,4', 4"-triisocyanate, m- and p-isocyanato-phenyl sulfonyl isocyanate, and the like; aliphatic polyisocyanates, such as ethylenediisocyanate, tetramethylenediisocyanate, hexamethylenediisocyanate, dodecamethylenediisocyante, 1,6,11-undecanediisocyanate, 2,2,4-trimethylhexanediisocyanate, lysine diisocyanate, 2,6-diisocyanato-methyl caproate, bis(2-isocyanato-ethyl fumarate, bis(2-isocyanato-ethyl) carbonate, 2-isocyanato-ethyl-2,6-diisocyanatohexanoate, and the like; alicyclic polyisocyanates, such as isophorone diisocyanate, dicyclohexylmethane diisocyanates (hydrogenated MDI), cyclohexylene diisocyanates, methylcyclohexylene diisocyanates (hydrogenated TDI), bis(2-isocyanato-ethyl) 4-cyclohexene-1,2-dicarboxylate, and the like; araliphatic polyisocyanates, such as xylylene diisocyanates, diethyl-benzene diisocyanates, and the like; and modified polyisocyanates, such as urethane-modified TDI, carbodiimide-modified MDI, urethane-modified MDI, trihydrocarbyl phosphate-modified MDI, and the like; as well as mixtures of two or more of them, such as combination of modified MDI with urethane-modified TDI (isocyanate-terminated prepolymer). Examples of suitable polyols, used for producing urethane-modified polyisocyanates (isocyanate-terminated prepolymer obtained from a polyol with excess polyisocyanate, such as TDI, MDI), include polyols having equivalent weight of 30–200, for example, glycols, such as ethylene glycol, propylene glycol, diethylene glycol and dipropylene glycol; triols, such as trimethylol propane and glycerol, polyols or higher funtionality, such as pentaerythritol and sorbitol; and alkylene oxide (EO and/or PO) adducts of them. Among these, preferred are those having a functionality of 2–3. Free isocyanate-content of these modified polyisocyanates and prepolymers are generally 8–33%, preferably 10–30%, more preferably 12–29%. Among these polyisocyanates, preferred one aromatic polyisocyanates and modified ones therefrom. More preferred are TDI (including 2,4-and 2,6-isomers, mixtures of them and crude TDI) and MDI (including 4,4'- and 2,4'-isomers, mixtures of them and crude MDI or PAPI), and modified polyisocyanates containing urethane, carbodiimide, allophanate, urea, biuret and/or isocyanurate groups, derived from these polyisocyanates (RDI and/or MDI). The most preferred are TDI, cruude MDI and modified MDI.

Polyurethanes, produced from polymer/polyol compositions, in accordance with the present invention, include foamed or cellular ones (foams), and non-cellular ones (such as elastomers, sheet materials and so on).

In producing polyurethane foams, foaming can be attained by using blowing agents, or by introducing gases, such as air (air loading), or combination of them. Examples of suitable blowing agents are reactive blowing agents, such as water, which generates carbon dioxide by reaction with polyisocyanate, and the like; and volatile blowing agents, for example, halogen-substituted aliphatic hydrocarbons, such as methylene chloride, chloroform, ethylidene dichloride, vinylidene chloride, trichlorofluoromethane, dichlorofluoromethane and the like; low-boiling hydrocarbons, such as butane, hexane, heptane and the like; and volatile organic solvents without halogen, such as acetone, ethyl acetate, diethylether and the like; as well as combinations of two or more of them. Among these, preferred are halogen-substituted aliphatic hydrocarbons (particularly freons, such as methylene chloride and trichlorofluoromethane), water and combinations of them. The amount of blowing agents can be varied according to the desired density of polyurethanes, which may vary widely, for instance, from 0.01 to 1.4 g/cm$^3$.

In producing polyurethanes, according to this invention, organic polyisocyanates and active hydrogen atom-containing components [(a), and optionally (b) and/or (c) and/or water]are reacted in such an amount provide NCO index of usually 80–140, preferably 85to 120, more preferably 95–115, most preferably 100–110. Furthermore, drastically higher NCO index than the above-mentioned range, for instance 150–5000 or more, preferably 300–1000, may be employed to introduce isocyanurate linkages into polyurethanes (resins or foams).

In producing polyurethanes according to this invention, there may be used, if necessary, any known materials, such as catalysts, and other auxiliaries, usually employed in producing polyurethanes.

Examples of suitable catalysts are amine catalysts, including tertiary amines, secondary amines, alkanolamines and quaternary ammonium hydroxides, for example, triethylamine, tributylamine, N-methylmorpholine, N-ethylmorpholine, N,N,N',N-tetramethylethylenediamine, pentamethyldiethylenetriamine, triethylenediamine, N-methyl-N'-di-methylamineoethyl-piperazine, N,N-dimethylbenzylamine, N,N-dimethylcyclohexylamine, N,N,N',N-tetramethyl-1,3-butane-diamine, 1,2-dimethylimidazole, dimethylamine, N-methyldiethanolamine, N-ethyldiethanolamine, N,N-dimethylethanolamine, N,N-diethylethanolamine, tetraalkylammonium hydroxides (such as tetramethylammonium hydroxide), aralkyltrialkylammonium hydroxides (such as benzyltrimethylammonium hydroxide), diazabicycloalkenes as disclosed in U.S. Pat. No. 4,524,104 (such as DBU), and the like; alkaline catalysts, including phenoxides, hydroxides, alkoxides and carboxylates of alkali metals (such as sodium and potassium), for example, sodium phenolate, potassium hydroxide, sodium methoxide, potassium acetate, sodium acetate, potassium 2-ethylhexanoate and the like; phosphines, such as triethylphosphine; metal chelate compounds, such as potassium-salicylaldehyde complex; organo tin compounds, including $Sn^{II}$ and $Sn^{IV}$ compounds, such as stannous acetate, stannous octoate (stannous 2-ethylhexoate), dibutyltin oxide, dibutyltin dichloride, dibutyltin diacetate, dibutyltin dilaurate, dibutyltin maleate, dioctyltin diacetate and the like; other organo metal compounds, such as di-alkyl titanate, lead naphtenate, and so on. Catalysts for trimerization of NCO groups forming isocyanurate ring, such as tris(dimethylaminomethyl)phenol, N,N',N''-tris(dimethylaminopropyl)hexahydro-s-triazine and the like, may also be used. These catalysts are used in small amounts, for instance, from about 0.001 to about 5% based on the weight of the reaction mixture.

Exemplary of other auxiliaries are surfactants, as emulsifiers and foam stabilizers, particularly silicone surfactants (polysiloxane-polyoxyalkylene copolymers) being important. Illustrative of other known additives are flame retardants (such as phosphorus compounds, halogen compounds, $Sb_2O_3$ and the like), retarders (such as acidic compounds), colorants (pigments and dyes), internal mold release agents (such as hydrocarbon waxes and silicone compounds), age resistors, antioxidants (such as hindered phenols), plasticizers, solvents, thixotropants (such as colloidal silica), germicides, fillers (such as carbon black, titanium dioxide, diatomaceus earth, glass fiber, shattered glass fiber, talc, mica, silica, sand, aluminum powder, graphite, asbestos, and the like), and so on.

Polyurethanes of the present invention can be produced in known manners, including one-shot process, semi-prepolymer process and prepolymer process. There may be used any known mixing or foaming machines usually employed in producing polyurethanes. In case where no solvent is used, mixing machines, such as kneaders and extruders, can be used. Production of various noncellular or cellular polyurethanes may be carried out in closed mold or open mold, usually by mixing raw materials with low pressure or high pressure mixing machines. Other methods, such as spray method, may also be used. It is preferred to produce polyurethanes by mixing and reacting using high pressure machines. Furthermore, polyurethanes may also be produced under vacuum to eliminate gases, such as air dissolved or mingled in raw materials, before and/or after mixing (particularly before mixing) of the raw materials.

The present invention is useful for producing high-resilient and firm, flexible and semi-rigid polyurethane foams, suitable for energy absorbers, or cushioning materials of automobiles, furnitures and so on, and for producing cellular and non-cellular rigid polyurethanes, as well as for producing polyurethanes suitable for adhesives, coatings and the like.

This invention is particularly useful for producing flexible polyurethane molded foams and slab foams.

The invention is also useful for producing molded articles by the RIM (reaction injection molding) method. Molding by the RIM method can be carried out in the same conditions as a conventional RIM method. For instance, Component A is prepared by mixing uniformly active hydrogen atom-containing compounds [(a) and optionally (b) and/or (c)] and optionally other additives (catalysts, surfactants and/or other additives), and then optionally adding thereto blowing agents (water and/or volatile blowing agents) or air loading. As Component B, is used polyisocyanate. These Components A and B are charged in the tanks A and B of the high pressure foaming machine. Components A and B are mixed in the mixing head and introduced into the mold, via the injection nozzle attached to the mold beforehand. Molding compositions may be the same as those in the known RIM methods. For example, the raw materials (2–4 components), conditioned at a temperature of 25° C.–90° C., are intimately mixed in an impingment mixhead under a pressure of 100–200 $Kg/cm^2G$ and then injected into a closed mold preheated to a temperature of 30° C.–200° C. (preferably 60° C.–90° C.), followed by demolding within 0.1–5 minutes. After demolding, molded articles thus obtained may be further aftercured or annealed. Annealing can be carried out, for 80° C.–160° C., more preferably 100° C.–150° C.), particularly for 1–30 hours at 120° C.–140° C.

Polymer/polyol compositions, prepared by polymerizing in situ in polyols monomers comprising an alpha-olefin containing at least 5 carbon atoms and/or a (meth)acrylate ester of an alcohol containing at least 9 carbon atoms, in accordance with the present invention, are of lower viscosity even at a higher polymer content, and capable of providing polyurethanes having improved properties.

Polymer/polyol compositions, prepared from monomers comprising said alpha-olefin, can provide polyurethane foams having improved properties, such as increased firmness and higher modulas. By using such polymer/polyol compositions having lower viscosity in producing molded foams, moldability can be improved because of good mold flow.

Polymer/polyol compositions, produced using said ester, can provide polyurethanes having improved properties, such as higher rebound elasticity and softer hand feeling.

Thus, polyurethanes formed from polymer/polyol compositions according to this invention are particularly useful as automotive parts, including interior trim and exterior trim, such as handles, sheet cushion, crash pads, bumpers, fenders, door panels, trunk lid and outer bodies, as well as elastomeric applications, and household implements, such as furnitures.

Having described the invention, reference will now be made to the following certain specific examples, which are included for purposes of illustration only and are not intended to be limiting. Raw materials used in the following examples are (1) Polyols:

Polyol A : a polyether polyol (OHV:34), produced by addition of PO to glycerol.

Polyol B : a polyether polyol (OHV:42, EO content:10%), produced by addition of PO to glycerol and sucrose (weight ratio 30/70), followed by tipping EO.

Polyol C : a polyether polyol (OHV:45, EO content: 4%), produced by successive addition of PO, EO and then PO to glycerol.

Polyol D : a polyether polyol (OHV:55), produced by addition of PO to glycerol.

Polyol E : a trihydric polyether polyol (OHV:28), produced by addition of 4,708 parts of PO to 92 parts of glycerol, followed by tipping 1,200 parts of EO.

Polyol F : a dihydric polyether polyol (OHV:28), produced by addition of 3,004 parts of PO to 76 parts of propylene glycol, followed by tipping 920 parts of EO.

Polyol G : a tetrahydric polyether polyol (OHV:32), produced by addition of 6,164 parts of PO to 136 parts of pentaerythritol, followed by tipping 700 parts of EO.

(2) Ethylenically unsaturated monomers:
OL124 alpha-olefin (C12/C14 weight ratio 56:44).
OL068 : alpha-olefin (C6–C8).
OL168 : alpha-olefin (C16–C18).
OL208 : alpha-olefin (C20–C28).
DMA : dodecyl methacrylate. TMA : tridecyl methacrylate.
TeMA : tetradecyl methacrylate. EA : eicosyl acrylate.
PMA : pentadecyl methacrylate. DA : docosyl acrylate.
HMA : hexadecyl methacrylate. MMA : methyl methacrylate.
OMA : octadecyl methacrylate. AN : acrylonitrile.
ST : styrene. DAM : dimethylaminoethyl methacrylate.

(3) Polymerization initiators and chain transfer agent:
BBCPD : bis(4-t-butylcyclohexyl)peroxydicarbonate.
AIBN : azobis(isobutyronitrile).
DM : dodecyl mercaptan. IPA : iso-propyl alcohol.

(4) Low molecular weight polyol:
EG : ethylene glycol.

(5) Polyisocyanate:
TDI-80 : TDI (2,4-/2,6-ratio:80/20
Liq-MDI : a carbodiimide modified MDI (NCO content:26%,
Corronate 1050, produced by Nippon Polyurethane K.K.)
Cr-MDI a crude MDI (NCO content:26%)

Catalysts:
DBTDL : dibutyltin dilaurate
DABC033LV : 33% solution of triethylene diamine in dipropylene glycol
U-28 : tin catalyst (Neostan U-28, produced by Nitto Kasei K.K.)

(7) Silicone surfactants
L-520 : polyether-polysiloxane block copolymer, produced by Nippon Uncar K.K.
SH-190 and SF-2962 : polyether-polysiloxane block copolymers, produced by Toray Silicone K.K (8) Toner
Black toner prepared by incorporating carbon black and stabilizers (a mixture of a UV absorber, an antioxidant and a heat-resistance improver) in a polyether polyol.

Measuring methods of properties of polyurethane foams or articles are as follows:
Tensile strength (kg/cm$^2$), Elongation at break (%), and Tear strength (kg/cm) : JIS K-6301.
25% and 65% ILD (kg/314cm$^2$), Rebound elasticity (5), and
Compression set (%) : JIS K-6382.
Hardness (shore A) : ASTM D-2240.

EXAMPLES I to XIX

According to formulations (parts) and polymerization conditions (temperature, °C., and time, hours) written in Tables 1, 2 and 3, polyols were charged into a reaction vessel equipped with a stirrer and temperature control means, and heated under stirring. Then, monomers, BBCPD and DM were continuously fed by pump over 2 hours, while maintaining the temperature at about 125° C., followed by stirring for additional 30 minutes at the same temperature. Finally, volatile matters were removed under reduced pressure to obtain finely dispersed polymer/polyol compositions (hereinafter referred to P/Polyols I to XII, respectively). OH-V (mg KOH/g) and viscosity (cps. at 25° C) of these polymer polyols were as shown in Tables 1, 2 and 3. Among these Examples of P/Polyols, II to IV and VI to XVIII are within the scope of this invention, and I, V and XIX are comparative examples.

TABLE 1

| Example | I | II | III | IV | V | VI | VII | VIII |
|---|---|---|---|---|---|---|---|---|
| Polyol A | 19.5 | 19.5 | 19.5 | 19.5 | 0 | 0 | 0 | 0 |
| Polyol B | 45.5 | 45.5 | 45.5 | 45.5 | 16.5 | 16.5 | 16.5 | 16.5 |
| Polyol C | 0 | 0 | 0 | 0 | 38.5 | 38.5 | 38.5 | 38.5 |
| AN | 17.5 | 17.5 | 17.5 | 17.5 | 13.5 | 13.5 | 13.5 | 13.5 |
| ST | 17.5 | 17.5 | 17.5 | 17.5 | 31.5 | 31.5 | 31.5 | 31.5 |
| OL124 | 0 | 2 | 3.5 | 7 | 0 | 2 | 5 | 2 |
| BBCPD | 0.7 | 0.7 | 0.7 | 0.7 | 0 | 0 | 0 | 0 |
| AIBN | 0 | 0 | 0 | 0 | 2.7 | 2.7 | 2.7 | 2.7 |
| DM | 0.35 | 0.35 | 0.35 | 0.35 | 0.1 | 0.1 | 0.1 | 0.1 |
| IPA | 0 | 0 | 0 | 0 | 0 | 0 | 0 | 5 |
| Temp. | 125 | 125 | 125 | 125 | 125 | 125 | 125 | 125 |
| Time | 2.5 | 2.5 | 2.5 | 2.5 | 2.5 | 2.5 | 2.5 | 2.5 |
| OH-V | 26 | 26 | 26 | 26 | 24 | 24 | 24 | 24 |
| Viscosity | 6800 | 4000 | 2500 | 2800 | * | 6900 | 4900 | 4000 |

(Note) *: solid

TABLE 2

| Example | IX | X | XI | XII |
|---|---|---|---|---|
| Polyol B | 16.5 | 16.5 | 16.5 | 16.5 |
| Polyol C | 38.5 | 38.5 | 38.5 | 38.5 |
| AN | 13.5 | 13.5 | 13.5 | 13.5 |
| ST | 31.5 | 31.5 | 31.5 | 31.5 |
| OL068 | 5 | 0 | 0 | 0 |
| OL124 | 0 | 5 | 0 | 0 |
| OL168 | 0 | 0 | 5 | 0 |
| OL208 | 0 | 0 | 0 | 5 |
| AIBN | 2.7 | 2.7 | 2.7 | 2.7 |
| DM | 0.1 | 0.1 | 0.1 | 0.1 |
| Temp. | 120 | 125 | 125 | 125 |
| Time | 2.5 | 2.5 | 2.5 | 2.5 |
| OH-V | 24 | 24 | 24 | 24 |
| Viscosity | 4000 | 4900 | 6000 | 12000 |

TABLE 3

| Example | XIII | XIV | XV | XVI | XVII | XVIII | XIX |
|---|---|---|---|---|---|---|---|
| Polyol E | 90 | 43 | 0 | 45 | 47.5 | 90 | 90 |
| Polyol F | 0 | 43 | 0 | 45 | 47.5 | 0 | 0 |
| Polyol G | 0 | 0 | 95 | 0 | 0 | 0 | 0 |
| Monomers | DMA | TeMA | HMA | EA | TeMA | TeMA | AN |
|  | 5 | 7 | 2.5 | 5 | 1.25 | 2.5 | 10 |
|  | TMA | PMA | OMA | DA | TMA | TMA |  |
|  | 5 | 7 | 2.5 | 5 | 1.25 | 2.5 |  |
|  |  |  |  |  | MMA | DAM |  |
|  |  |  |  |  | 2.5 | 5 |  |
| AIBN | 1.0 | 1.0 | 0.5 | 1.0 | 1.0 | 1.0 | 1.0 |
| Temp. | 130 | 130 | 130 | 130 | 120 | 130 | 130 |

TABLE 3-continued

| Example | XIII | XIV | XV | XVI | XVII | XVIII | XIX |
|---|---|---|---|---|---|---|---|
| Time | 2.5 | 2.5 | 2.5 | 2.5 | 2.5 | 2.5 | 2.5 |
| OH-V | 25.2 | 24.1 | 30.4 | 25.2 | 26.6 | 25.2 | 25.2 |

EXAMPLES 1 TO 3, AND COMPARATIVE EXAMPLE 1

Polyurethane foams were produced according to foaming formulations (parts), written in Table 4.

Properties and density (kg/m3, JIS K-6301) of the resulting foams were measured, and the results were shown in Table 4.

TABLE 4

| Example No. | Comparative Example 1 | Example 1 | Example 2 | Example 3 |
|---|---|---|---|---|
| Polyol D | 100 | 50 | 50 | 50 |
| P/Polyol I | 0 | 50 | 0 | 0 |
| P/Polyol III | 0 | 0 | 50 | 0 |
| P/Polyol VIII | 0 | 0 | 0 | 50 |
| Water | 4.5 | 4.5 | 4.5 | 4.5 |
| DABCO 33LV | 0.3 | 0.3 | 0.3 | 0.3 |
| U-28 | 0.28 | 0.28 | 0.35 | 0.32 |
| L-520 | 1.5 | 1.5 | 1.5 | 1.5 |
| TDI-80 | 54.5 | 54.5 | 54.5 | 54.5 |
| Density | 25.0 | 25.9 | 26.0 | 26.0 |
| 25% ILD | 10.6 | 20.5 | 20.7 | 17.0 |
| Tensile strength | 0.89 | 1.08 | 1.15 | 1.17 |
| Tear strength | 0.66 | 0.75 | 0.65 | 0.60 |
| Elongation at break | 160 | 100 | 106 | 120 |
| Rebound elasticity | 40 | 34 | 35 | 35 |
| Compression set | 3.9 | 8.9 | 8.6 | 8.8 |

EXAMPLES 4 TO 11, AND COMPARATIVE EXAMPLES 2 TO 5

According to the formulations (parts), written in Tables 5 and 6, Component A comprising active hydrogen atom-containing compounds, and Component B comprising liq-MDI were charged into raw material tanks A and B, respectively, of a high pressure foaming machine (Kraus-Maffei PU40/40). Under the following molding conditions, Components A and B were mixed vigorously with the foaming machine, and introduced into a temperature controllable planar mold [1,000 mm×400 mm×5 mm (thickness)]to obtain polyurethane articles. Molding conditions]

Material temperature : about 38 +42° C. (both the components)
Mold temperature about 38°±42° C.
Delivery rate about 500 g/second
Injection pressure 140–160 Kg/cm2G (both the components)
Injection time about 2.0–3.0 sec.
Isocyanate index 105
Demolding time 60 second Properties and density (g/cm3, buoyancy method) of the resulting articles were measured, and the results were shown in Tables 5 and 6.

TABLE 5

| Example No. | 4 | 5 | 6 | 7 | 8 | 9 |
|---|---|---|---|---|---|---|
| Component A | | | | | | |
| P/Polyol | XIII | XIV | XV | XVI | XVII | XVIII |
|  | 90 | 90 | 90 | 90 | 90 | 90 |
| EG | 6 | 7 | 5.5 | 7 | 6 | 6 |
| DABCO 33LV | 2.0 | 2.0 | 2.0 | 2.0 | 2.0 | 2.0 |
| Freon 11 | 15 | 15 | 15 | 15 | 15 | 15 |
| SH-190 | 0.5 | 0.5 | 0.5 | -0.5 | 0 | 0 |
| Toner | 10 | 10 | 10 | 10 | 10 | 10 |
| Component B | | | | | | |
| Liq-MDI | 49.6 | 55.8 | 48.1 | 55.8 | 50.0 | 49.6 |
| Properties | | | | | | |
| Density | 0.60 | 0.70 | 0.50 | 0.70 | 0.60 | 0.60 |
| Tensile strength | 30.7 | 31.2 | 26.2 | 32.4 | 32.0 | 31.6 |
| Elongation | 120 | 150 | 105 | 145 | 110 | 125 |
| Tear strength | 9.8 | 10.3 | 8.2 | 10.7 | 9.5 | 10.2 |
| Hardness | 60 | 67 | 52 | 69 | 63 | 61 |
| Rebound elasticity | 54 | 49 | 51 | 48 | 52 | 53 |

TABLE 6

| | Example | | | Comparative Example | | | |
|---|---|---|---|---|---|---|---|
| Example No. | 10 | 11 | 12 | 2 | 3 | 4 | 5 |
| Component A | | | | | | | |
| P/Polyol | XIII | XIV | XVII | | | | XIX |
|  | 40 | 40 | 40 | 0 | 0 | 0 | 90 |
| Polyol | F | E | F | E | E + F | G | |
|  | 50 | 50 | 50 | 90 | 45 + 45 | 6 | 0 |
| EG | 7 | 7 | 7 | 6 | 7 | 5.5 | 6 |
| DABCO 33LV | 2.0 | 2.0 | 2.0 | 2.0 | 2.0 | 2.0 | 2.0 |
| Freon 11 | 15 | 15 | 15 | 15 | 15 | 15 | 15 |
| SH-190 | 0.5 | 0.5 | 0 | 0 | 0 | 0 | 0 |
| Toner | 10 | 10 | 10 | 10 | 10 | 10 | 10 |
| Component B | | | | | | | |
| Liq-MDI | 56.0 | 56.1 | 56.0 | 50.5 | 56.7 | 48.6 | 49.6 |
| Properties | | | | | | | |
| Density | 0.60 | 0.60 | 0.60 | 0.60 | 0.70 | 0.50 | 0.60 |
| Tensile strength | 32.3 | 31.5 | 31.3 | 32.5 | 34.0 | 27.0 | 36.0 |
| Elongation | 135 | 165 | 145 | 125 | 145 | 110 | 85 |
| Tear strength | 10.5 | 10.4 | 10.6 | 10.3 | 11.4 | 9.5 | 12.0 |
| Hardness | 62 | 61 | 61 | 61 | 68 | 54 | 76 |
| Rebound elasticity | 47 | 46 | 46 | 42 | 39 | 40 | 34 |

EXAMPLES 12 to 14, AND COMPARATIVE EXAMPLES 6 to 8

According to the formulations (parts), written in Table 7, Component A comprising active hydrogen atom-containing compounds and catalyst, and Component B comprising TDI-80/Cr-MDI 8/2 mixture were charged into raw material tanks of a low pressure foaming machine (MEG-E-24);1 and were mixed vigorously with the foaming machine under the following molding conditions, followed by introducing into a closed mold [100 mm (thickness)×300 mm×300 mm]to obtain polyurethane foams.

[Molding conditions]

Material temperature : about 25°±2° C. (both the components)
Mold temperature about 60 +2° C.
Delivery rate about 130 g/second
Injection pressure about 3.0 sec.
Injection time about 3.0 sec.
Isocyanate index 105
Demolding time 8 minutes Properties and density (g/cm³, actual dimension measurements) of the resulting foams were measured, and the results were shown in Table 7.

TABLE 7

|  | Example | | | Comparative Example | | |
|---|---|---|---|---|---|---|
| Example No. | 13 | 14 | 15 | 6 | 7 | 8 |
| Component A |  |  |  |  |  |  |
| P/Polyol | XV 100 | XVII 100 | XVIII 100 | 0 | 0 | XIX 100 |
| Polyol | 0 | 0 | 0 | E 100 | G 100 | 0 |
| Water | 3.0 | 3.0 | 3.0 | 3.0 | 3.0 | 3.0 |
| DABCO 33LV | 0.6 | 0.6 | 0.6 | 0.6 | 0.6 | 0.6 |
| SF-2962 | 1.0 | 1.0 | 1.0 | 0.3 | 0.3 | 0.4 |
| Component B |  |  |  |  |  |  |
| TDI-80/Cr-MDI(8/2) | 38.2 | 37.3 | 37.3 | 37.8 | 38.5 | 37.3 |
| Properties |  |  |  |  |  |  |
| Density | 46.3 | 46.6 | 46.1 | 47.0 | 46.5 | 47.5 |
| Tensile strength | 1.26 | 1.24 | 1.26 | 1.16 | 1.20 | 1.25 |
| Elongation | 114 | 128 | 122 | 125 | 110 | 120 |
| Tear strength | 0.68 | 0.72 | 0.69 | 0.60 | 0.65 | 0.70 |
| 25% ILD | 12.6 | 13.2 | 13.0 | 11.6 | 11.9 | 12.9 |
| 65% ILD | 36.2 | 37.5 | 36.1 | 31.7 | 31.9 | 35.6 |
| Rebound elasticity | 68 | 65 | 68 | 58 | 61 | 60 |
| Compression set | 4.5 | 4.3 | 4.6 | 4.5 | 4.0 | 4.5 |

Having fully described the present invention, it will be apparent to one skilled in the art that many modifications and variations to the above can be made while remaining within the spirit and scope of the present invention.

What is claimed as new and desired to be secured by Letters Patent of the United States is:

1. A polymer/polyol composition, which is convertible by reaction with a polyisocyanate to a polyurethane, wherein the polymer of said composition is formed by polymerizing, in situ in at least one polyol, at least one ethylenically unsaturated monomer comprising an alpha-olefin containing at least 5 carbon atoms, an acrylate or methacrylate ester of an alcohol containing at least 9 carbon atoms, or a mixture of two or more of the same; said polyol comprising a polyol having a hydroxyl number of 15-200, and being selected from the group consisting of polyether polyols, polyester polyols, urethane-modified polyols, polyols modified so as to contain polymerizable unsaturated bonds in the molecules and polymer/polyols previously presented in situ in any of these polyols; said polymer being present in an amount of 1-80% based on the weight of said composition.

2. The composition of claim 1, wherein said monomer comprises at least one alpha-olefin containing 5-30 carbon atoms, or a combination thereof with at least one other monomer selected from the group consisting of aromatic hydrocarbon monomers, unsaturated nitriles, ethylenically unsaturated carboxylic acids and derivatives thereof, other aliphatic hydrocarbon monomers, halogen-containing vinyl monomers, nitrogen-containing vinyl monomers and vinyl-modified silicones.

3. The composition of claim 2, wherein said other monomer is at least one compound selected from the group consisting of aromatic hydrocarbon monomers, unsaturated nitriles and esters of acrylic or methacrylic acid.

4. The composition of claim 1, wherein said monomer comprises 0.5-50% of said alpha-olefin, 0-90% of an aromatic hydrocarbon monomer, 0-99.5% of unsaturated nitrile and 0-50% of an ester of acrylic or methacrylic acid, based on the total weight of the monomers.

5. The composition of claim 1, wherein said alpha-olefin has 6-30 carbon atoms.

6. The composition of claim 1, wherein said monomer comprises at least one acrylate or methacrylate ester of the formula:

$$CH_2=CR'-COO-R \tag{1}$$

wherein R' is hydrogen or methyl group, and R is an alkyl group containing 9-30 carbon atoms, or a combination thereof with at least one other monomer selected from the group consisting of aromatic hydrocarbon monomers, unsaturated nitriles, ethylenically unsaturated carboxylic acids and derivatives thereof, aliphatic hydrocarbon monomers, nitro group-containing monomers and vinyl esters.

7. The composition of claim 6, wherein said other monomer is at least one compound selected from the group consisting of unsaturated nitriles, esters of acrylic or methacrylic acid, and aromatic hydrocarbon monomers.

8. The composition of claim 6, wherein said other monomer comprises methyl methacrylate.

9. The composition of claim 1, wherein said monomer comprises at least 5% of said ester.

10. The composition of claim 1, wherein said polyol comprises a polyether polyol.

11. The composition of claim 8, wherein said polyether polyol contains at least 5% by weight of polyoxyethylene units.

12. A process for producing a polymer/polyol composition, convertible by reaction with a polyisocyanate to a polyurethane, which comprises polymerizing in situ in at least one polyol, at least one ethylenically unsaturated monomer comprising an alpha-olefin containing at least 5 carbon atoms, an acrylate or methacrylate ester of an alcohol containing at least 9 carbon atoms, or a mixture of two or more of the same; said polyol comprising a polyol having a hydroxyl number of 15-200, and being selected from the group consisting of polyether polyols, polyester polyols, urethane- modified polyols, polyols modified so as to contain polymerizable unsaturated bonds in the molecules and polymer/polyols previously presented in situ in any of these polyols; said polymer being present in an amount of 1-80% based on the weight of said composition. previously prepared in situ in any of these polyols; and said polymer being present in an amount of 1-80% based on the weight of said composition.

13. A process for producing a cellular or noncellular polyurethane, which comprises reacting an organic polyisocyanate with active hydrogen atom-containing component comprising the polymer/polyol composition claimed in claim 1, in the presence of or in the absence of one or more additives selected from catalysts, blowing agents, surfactants and other additives.

14. A process for producing a cellular or noncellular polyurethane, which comprises reacting an organic polyisocyanate with active hydrogen atom-containing component comprising the polymer/polyol composition claimed in claim 2, in the presence of or in the absence of one or more additives selected from catalysts, blowing agents, surfactants and other additives.

15. The process of claim 14, wherein said polyisocyanate is reacted with an active hydrogen atom-containing component comprising, based on the weight of said component:
 (i) at least 5% of said polymer/polyol composition;
 (ii) 0–95% of at least one other high molecular weight polyol, having equivalent weight of 200–4,000, selected from the group consisting of polyether polyols, polyester polyols and modified polyols; and
 (iii) 0–30% of at least one low molecular weight compound containing at least two active hydrogen atom-containing groups, said compound having equivalent weight of at least 30 and less than 200, selected from the group consisting of low molecular weight polyols and amines.

16. A process for producing a cellular or noncellular polyurethane, which comprises reacting an organic polyisocyanate with active hydrogen atom-containing component comprising the polymer/polyol composition claimed in claim 6, in the presence of or in the absence of one or more additives selected from catalysts, blowing agents, surfactants and other additives.

17. The process of claim 16, wherein said polyisocyanate is reacted with an active hydrogen atom-containing component comprising, based on the weight of said component:
 (i) at least 20% of said polymer/polyol composition;
 (ii) 0–70% of at least one other high molecular weight polyol, having equivalent weight of 200–4,000, selected from the group consisting of polyether polyols, polyester polyols and modified polyols; and
 (iii) 0–30% of at least one molecular weight compound containing at least two active hydrogen atom-containing groups, said compound having equivalent weight of at least 30 and less than 200, selected from the group consisting of low molecular weight polyols and amines.

18. A polyurethane foam, having improved firmness, produced by the process of claim 14.

19. A polyurethane foam, having improved elasticity, produced by the process of claim 16.

20. The process of claim 13, wherein polyurethane molded article is formed by reaction injection molding.

* * * * *